(12) United States Patent
Heuver

(10) Patent No.: US 10,697,502 B2
(45) Date of Patent: Jun. 30, 2020

(54) MULTI-AREA PISTON

(71) Applicant: Ford Global Technologies, LLC, Dearborn, MI (US)

(72) Inventor: Bradley Ronald Heuver, South Lyon, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 269 days.

(21) Appl. No.: 15/651,611

(22) Filed: Jul. 17, 2017

(65) Prior Publication Data

US 2019/0017556 A1 Jan. 17, 2019

(51) Int. Cl.
| | |
|---|---|
| F16D 13/52 | (2006.01) |
| F16D 25/08 | (2006.01) |
| F16H 63/30 | (2006.01) |
| F16D 25/0638 | (2006.01) |

(52) U.S. Cl.
CPC ........... *F16D 25/082* (2013.01); *F16D 13/52* (2013.01); *F16D 25/0638* (2013.01); *F16H 63/3026* (2013.01)

(58) Field of Classification Search
CPC .... F16D 25/082; F16D 25/0638; F16D 13/52; F16H 63/3026
See application file for complete search history.

(56) References Cited

U.S. PATENT DOCUMENTS

| | | | |
|---|---|---|---|
| 3,915,274 A | 10/1975 | Utter | |
| 4,741,422 A | 5/1988 | Fuehrer et al. | |
| 4,759,432 A | 7/1988 | Juergens et al. | |
| 5,209,154 A | 5/1993 | Black | |
| 6,378,682 B1 | 4/2002 | Mohan et al. | |
| 6,382,382 B1 | 5/2002 | Avny et al. | |
| 7,104,380 B2 | 9/2006 | Bishop et al. | |
| 7,736,264 B2 | 6/2010 | Moorman et al. | |
| 7,913,828 B2 | 3/2011 | Moorman et al. | |
| 8,037,988 B2 | 10/2011 | Long et al. | |
| 8,534,437 B2 | 9/2013 | Wilton | |
| 8,602,940 B2 * | 12/2013 | Kuwahara | B60K 6/387 477/86 |
| 2010/0300828 A1 | 12/2010 | Kinch | |

(Continued)

OTHER PUBLICATIONS

U.S. Appl. No. 15/080,910, filed Mar. 25, 2016, 14 pgs.

*Primary Examiner* — David J Hlavka
(74) *Attorney, Agent, or Firm* — Vincent Mastrogiacomo; Brooks Kushman P.C.

(57) ABSTRACT

A transmission includes a case defining a bore and a piston disposed within the bore. The piston and the case define a fluid chamber in fluid communication with a fluid source. The piston includes an annular piston body defining a plurality of auxiliary bores angularly spaced along the annular piston body about a central axis of the annular piston body. The piston further includes a plurality of auxiliary pistons disposed within the auxiliary bores. The piston body and the auxiliary pistons have rear surfaces in communication with the fluid chamber. The transmission further includes a clutch pack disposed opposite the piston from the fluid chamber. The clutch pack includes at least one friction plate, at least one separator plate, and at least one separator spring. The transmission further includes a return spring adapted to bias the annular piston body in a direction away from the clutch pack.

10 Claims, 4 Drawing Sheets

(56) References Cited

U.S. PATENT DOCUMENTS

| | | |
|---|---|---|
| 2011/0319226 A1 | 12/2011 | Brevick et al. |
| 2013/0161146 A1* | 6/2013 | Hemphill ............ F16D 25/0635 |
| | | 192/85.17 |
| 2015/0260237 A1 | 9/2015 | Saito et al. |
| 2017/0241487 A1* | 8/2017 | Sasahara ................ F16D 13/52 |

* cited by examiner

MULTI-AREA PISTON

TECHNICAL FIELD

The present disclosure relates to transmissions and clutch systems utilized in transmissions.

BACKGROUND

Vehicle transmissions, transaxles, or other mechanisms that employ more than one gearing ratio between an input and an output, may transition between various gear ratios by engaging and disengaging various clutches. The clutches may comprise alternating friction plates and separator plates that are configured to selectively couple two rotating elements (shafts, gears, etc.).

SUMMARY

In at least one approach, a transmission may include a case defining a bore and a piston disposed within the bore. The piston and the case may define a fluid chamber in fluid communication with a fluid source. The piston may include an annular piston body defining a plurality of auxiliary bores angularly spaced along the annular piston body about a central axis of the annular piston body. The piston may further include a plurality of auxiliary pistons disposed within the auxiliary bores. The piston body and the auxiliary pistons may have rear surfaces in communication with the fluid chamber. The transmission may further include a clutch pack disposed opposite the piston from the fluid chamber. The clutch pack may include at least one friction plate, at least one separator plate, and at least one separator spring. The transmission may further include a return spring adapted to bias the annular piston body in a direction away from the clutch pack.

In at least one approach, a method is provided for actuating a dual-stage piston. The dual-stage piston may have an annular piston body defining a plurality of auxiliary bores spaced along the piston body, and a plurality of auxiliary pistons disposed within the auxiliary bores. The method may include increasing a fluid pressure in a bore chamber to a first pressure to actuate the auxiliary pistons. The method may further include increasing the fluid pressure in the bore chamber to a second pressure greater than the first pressure to actuate the piston body.

In at least one approach, a clutch engagement piston may have a first face for interfacing a fluid chamber and a second face opposite the first face for interfacing a clutch pack. The clutch engagement piston may include an annular piston body defining a plurality of auxiliary bores angularly spaced about a central axis of the piston body. The clutch engagement piston may further include a plurality of auxiliary pistons disposed within the auxiliary bores and axially displaceable relative to the piston body.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
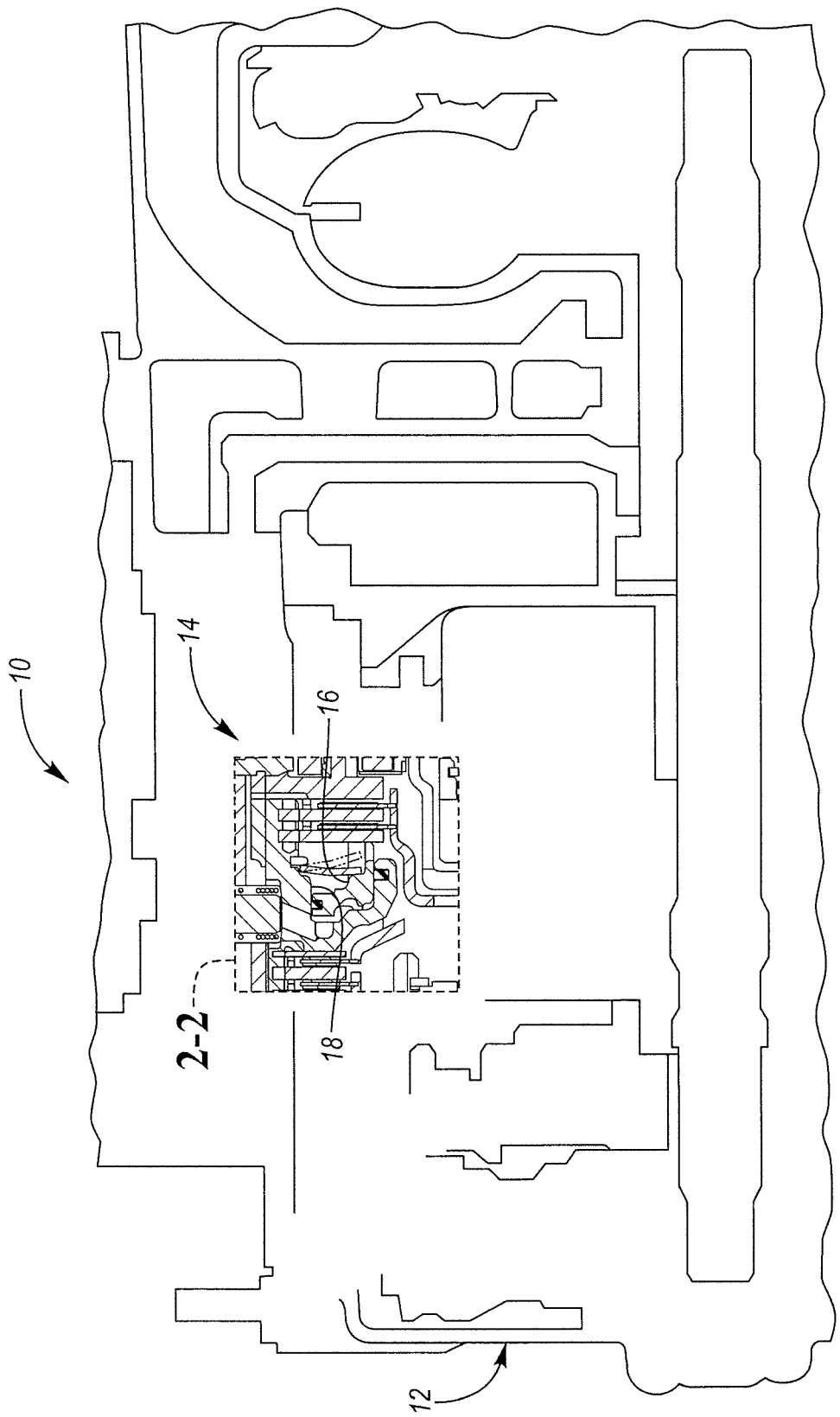
FIG. 1 is a partial cross-section representative of the internal workings of a transmission or transaxle.

Referring to FIG. 1, a partial cross-section representative of the internal workings of a transmission 10 (or transaxle) is illustrated. The transmission 10 includes a transmission case 12 that houses rotating elements such as gears, shafts, etc. A gearing arrangement within the transmission 10 is a collection of these rotating elements (gears, shafts, etc.) and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. The transmission 10 may be a discrete ratio transaxle that has a shiftable gearing arrangement that selectively imposes a variety of speed ratios between an input shaft and an output shaft of the transmission.

A group of elements (gears, shafts, etc.) are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake.

Hydraulically actuated clutches may be engaged when hydraulic fluid forces a piston into contact with a clutch pack, consisting of alternating friction plates and separator plates. The friction plates may be fixed to a first rotating element while the separator plates are fixed to a second rotating element, or vice versa. Alternatively, the friction plates may be connected to a first rotating element while the separator plates are grounded to a transmission case, or vice versa. A hydraulic clutch 14 is disposed within the transmission case 12. The hydraulic clutch 14 includes a piston 16 that engages an internal bore 18 within the transmission case 12.

Figure 2:
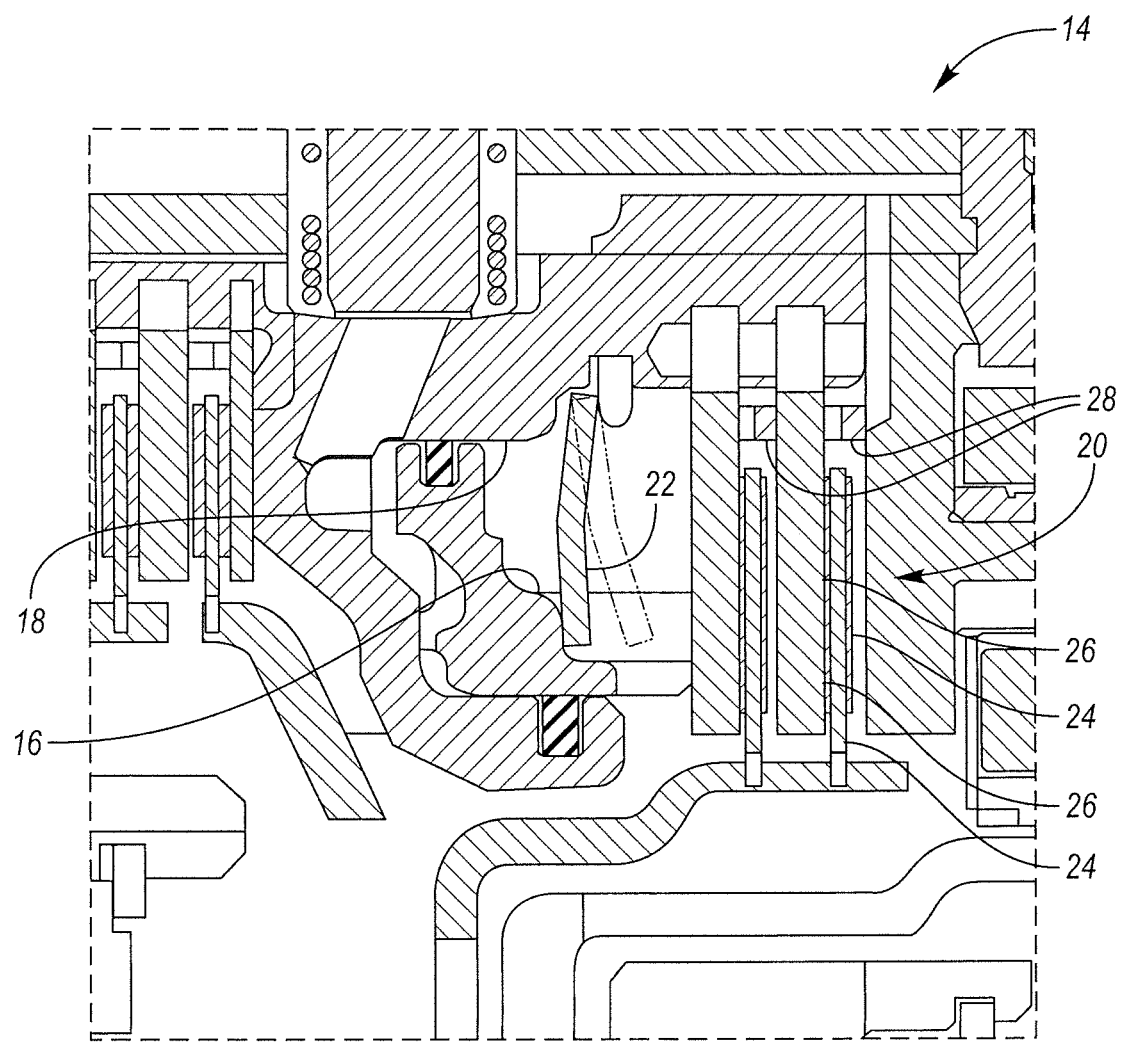
FIG. 2 is an enlarged view of the area encompassed by Area 2-2 shown in FIG. 1.

Referring to FIG. 2, an enlarged view of the area encompassed by Area 2-2 in FIG. 1 further illustrates the hydraulic clutch 14 and internal bore 18 within the transmission case 12. The internal bore 18 may define a fluid chamber for receiving hydraulic fluid. The hydraulic fluid may fill the space defined by the internal bore 18 and the piston 16 to hydraulically actuate the piston 16. The piston 16 may be hydraulically actuated to engage a clutch pack 20. More particularly, the piston 16 may be hydraulically actuated to compress one or more friction plates 24, separator plates 26, and separator springs 28. The piston 16 may also be biased out of engagement with the clutch pack 20 by an annular return spring 22.

Figure 3:
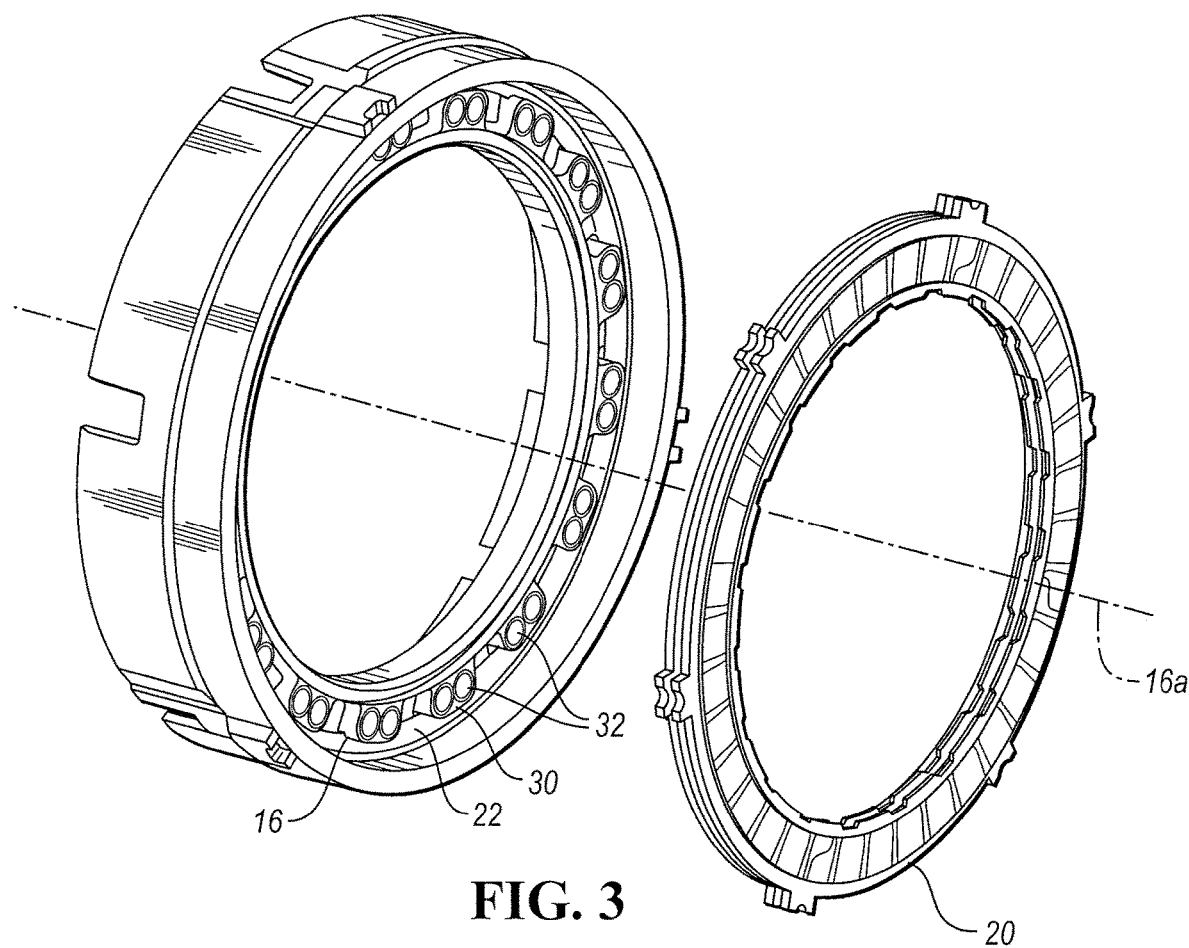
FIG. 3 is a perspective view of a clutch engagement piston and engageable clutch.
Figure 4:
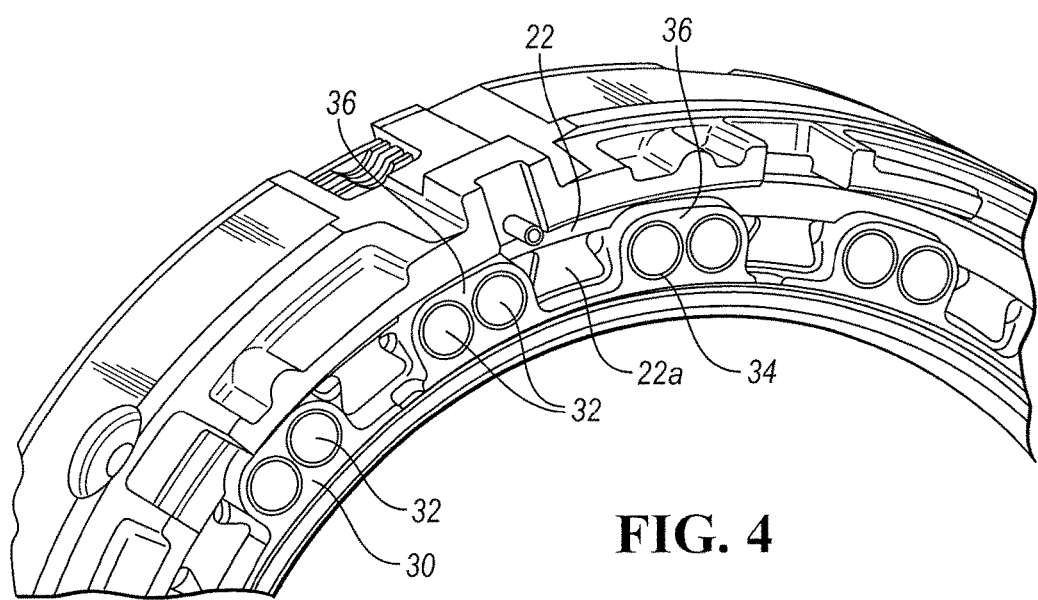
FIG. 4 is an enlarged perspective view of the clutch engagement piston shown in FIG. 3.

Referring now to FIGS. 3 and 4, the piston 16 may be a multi-area piston. For example, the piston 16 may be a dual-area piston having a piston body 30 and at least one auxiliary piston 32. More particularly, the piston body 30 may have a forward face 30a defining a first area, and the auxiliary pistons 32 may have forward faces 32a that together make up a second area.

The piston body 30 may be an annular piston body disposed about a central axis 16a of the piston 16. In this way, the central axis of the piston body 30 may be coaxial with the central axis 16a of the piston 16.

The piston body 30 may define one or more nodes 36. The nodes 36 may define an engagement surface, which may be a forward face 30a of the piston body 30. For example, the piston body 30 may define two nodes, three nodes, four nodes, or five or more nodes. In at least one approach, the piston body 30 defines sixteen nodes 36 angularly spaced about the central axis of the piston body 30. The nodes may be spaced about the piston body 30 (e.g., angularly spaced about the central axis of the piston body 30) such that each node 36 is spaced equidistant from adjacent nodes 36.

One or more auxiliary bores 34 may be disposed in the nodes 36 formed in the piston body 30. In at least one approach, a single bore 34 is formed in an individual node 36. In another approach, two bores 34 are formed in an individual node 36.

Resilient tabs 22a of the return spring 22 may be disposed between adjacent nodes 36 and in engagement with the piston body 30; for example, at a recessed surface of the piston body 30 axially spaced from the forward face 30a. The resilient tabs 22a may bias the piston body 30 out of engagement with the clutch pack 20.

The auxiliary pistons 32 may be spaced about the piston body 30. For example, the auxiliary pistons 32 may be angularly spaced about the central axis of the piston body 30. In at least one approach, the auxiliary pistons 32 are disposed in the auxiliary bores 34 formed in the piston body 30.

The auxiliary pistons 32 may be radially spaced from a central axis of the piston body 30. For example, the auxiliary pistons may be spaced about 90 millimeters radially from the central axis of the piston body 30.

Figure 5:
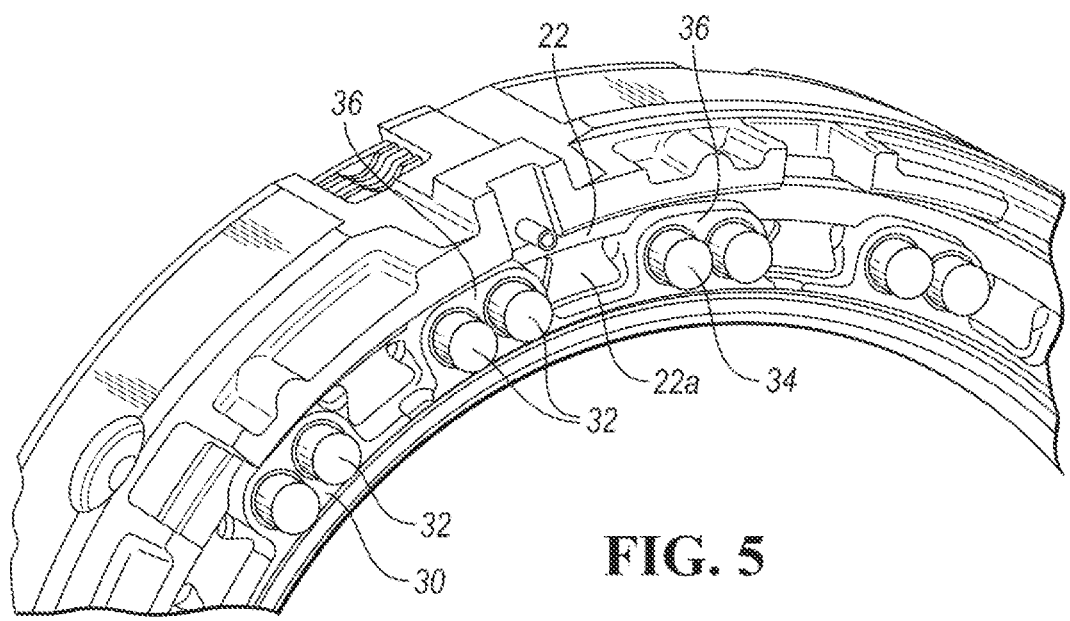
FIG. 5 is an enlarged perspective view of the clutch engagement piston of FIG. 3, according to another embodiment.

The auxiliary pistons 32 may be cylindrical auxiliary pistons. In at least one approach, the length of the individual auxiliary pistons 32 corresponds, or substantially corresponds, to a depth of the bores 34, and thereby corresponds to a depth of the piston body 30. In this way, when in the retracted configuration, the auxiliary pistons 32 have a forward surface 32a that is substantially flush with a forward surface 30a of the piston body 30. In at least one other approach, the length of the individual auxiliary pistons 32 is greater than a depth of the bores 34, as shown in FIG. 5.

The auxiliary pistons 32 may be manufactured such that the length is greater than the outer diameter. In at least one approach, individual auxiliary pistons 32 have an outer diameter in the range of approximately 2 to 10 millimeters. For example, individual auxiliary pistons 32 may have an outer diameter of approximately 8 millimeters. Individual auxiliary pistons 32 may have a length in the range of approximately 4 to 20 millimeters, and in one exemplary approach, 16 millimeters. Such a configuration may provide additional axial stability as the auxiliary pistons 32 axially translate within the bores 34.

In at least one approach, the auxiliary pistons 32 are disposed within the bores 34 in direct engagement with the piston body 30. Tight manufacturing tolerances may permit the auxiliary pistons 32 to be retained within the bores 34. For example, individual auxiliary pistons 32 may be manufactured to have an outer diameter substantially corresponding to an inner diameter of the bores 34. As such, the piston 16 may be free of seals between the auxiliary pistons 32 and the bores 34 of the piston body 30. In this way, movement of the auxiliary pistons 32 relative to the bores 34 may be permitted in the axial direction, while controlling for axially alignment of the auxiliary pistons 32.

In one example, a piston 16 may have a diameter of approximately of approximately 65 millimeters, thereby forming a total surface area of approximately 3,318 millimeters. A total of 32 individual auxiliary pistons 32 may be disposed about the central axis of the piston body 30. Individual auxiliary pistons 32 may have a diameter of approximately 8 millimeters, such that each auxiliary piston 32 has a surface area (e.g., surface 32a) of approximately 50.265 millimeters. In this way, the auxiliary pistons 32 may have a combined surface area of approximately 1,608.5 millimeters, and the piston body 30 may have a surface area (e.g., surface 30a defined by the nodes 36) of approximately 1709.8 millimeters.

The piston body 30 and the auxiliary pistons 32 may define rear surfaces in communication with the fluid chamber defined by the internal bore 18. In this way, hydraulic fluid may be injected into the internal bore 18 to actuate the auxiliary pistons 32 at a first pressure, and the piston body at a second pressure, as described in greater detail elsewhere herein. Actuation of the auxiliary pistons 32 causes forward surfaces 32a of the auxiliary pistons 32 to engage the clutch pack 20. Similarly, actuation of the piston body 30 causes a forward surface 30a of the piston body 30 to engage the clutch pack 20.

In at least one application, it may be desirable to actuate the auxiliary pistons 32 without, or prior to, actuating the piston body 30.

In the arrangement described herein, a multi-area piston 16 may be a multi-stage piston. For example, the piston 16 may be a dual-stage piston having a first area actuatable at a first hydraulic pressure, and a second area actuatable at a second hydraulic pressure greater than the first hydraulic pressure. More particularly, the auxiliary pistons 32 may be actuated in a first stage at a first hydraulic pressure, and the piston body 30 may be actuated in a second stage at a second hydraulic pressure that is greater than the first hydraulic pressure. In at least one other approach, the multi-stage piston may be a three-stage piston having a first area actuatable at a first hydraulic pressure, a second area actuatable at a second hydraulic pressure greater than the first hydraulic pressure, and a third area actuatable at a third hydraulic pressure greater than the second hydraulic pressure. The multi-stage piston may also be provided with four or more areas, and the four or more areas may be actuatable at four or more discrete hydraulic pressures.

In the first stage, the piston 16 may be actuated such that only the auxiliary pistons 32, and not the piston body 30, are actuated. As used herein, a component of the piston 16 is actuated when it is axially displaced. Axial displacement of a component may effect actuation (e.g., compression) in the clutch pack 20.

Actuation of the auxiliary pistons 32 may effect an axial displacement of the auxiliary pistons 32 relative to the piston body 30. The auxiliary pistons 32 may be axially displaced such that forward faces 32a of the auxiliary pistons 32 are axially displaced relative to the forward face 30a of the piston body. For example, in the first stage, the forward faces 32a of the auxiliary pistons 32 may be axially displaced a distance in the range of approximately 1.5 millimeters to approximately 3 millimeters from the forward face 30a of the piston body. In one example, the auxiliary pistons 32 may be actuated at a first pressure of less than 15 pounds per square inch (psi) (e.g., approximately 14.5 psi).

In the first stage, engagement of the auxiliary pistons 32 with the clutch pack 20 may bring the clutch pack 20 to a first torque transfer configuration (which may be referred to as "cinch"). When in the first torque transfer configuration, the friction plates 24 and the separator plates 26 of the clutch pack 20 overcome the separating force of the separator springs 28 such that opposing faces of the friction plates 24 and separator plates 26 are brought into engagement to transfer a first amount of torque through the clutch pack 20. The first amount of torque may be, for example, in the range of approximately 2 to 24 ft·lbf. The first amount of torque may be sufficient enough to offset the torque transfer created by the inherent drag, thereby negating unintended torque transfer within the transmission. Also when in the first stage, the piston body 30 may be maintained (e.g., by the return spring 22) in spaced relation relative to the clutch pack 20.

The piston 16 may further be actuated in a second stage when the hydraulic fluid in the fluid chamber achieves the second hydraulic pressure. In the second stage, hydraulic fluid acts to move the piston body 30 to an actuated position. For example, the piston body 30 may be actuated at a second hydraulic pressure greater than 50 psi (e.g., approximately 50.6 psi). In the second stage, the piston body 30 engages the clutch pack 20 to bring the clutch pack 20 to a second torque transfer configuration. In the second torque transfer mode, the piston 16, through both the piston body 30 and the auxiliary pistons 32, transfers a second amount of torque through the clutch pack 20. The second amount of torque is greater than the first amount of torque transferred when the clutch pack is in the first torque transfer configuration. For example, the second amount of torque may be in the range of approximately 80 to 290 ft·lbf.

Hydraulic pressure within the fluid chamber defined within the internal bore 18 may be reduced to disengage the piston body 30 or both the piston body 30 and the auxiliary pistons 32 from the clutch pack 20. For example, when the hydraulic pressure is reduced to be below the second hydraulic pressure (e.g., below 50 psi), the return spring 22 may act to bias the piston body 30 away from the clutch pack 20. When the hydraulic pressure is reduced to below the first hydraulic pressure (e.g., below 15 psi), the separator springs 28 may act to separate the friction plates 24 from the separator plates 26 of the clutch pack 20. Expansion of the clutch pack 20 by the separator springs 28 may act to bias the auxiliary pistons 32 into the bores 34 of the piston body 30, and may further act to bias both the piston body 30 and the auxiliary pistons 32 in the axial direction away from the clutch pack 20.

The dual-area piston 16 described herein may be used in conventional transmission systems without the need for additional actuation components. This is because the both the piston body 30 and the auxiliary pistons 32 have surfaces exposed to the fluid chamber, and may therefore be activated under fluid pressure and without the need for additional or dedicated solenoids, valves, or springs. The dual-area piston 16 described also utilizes the clutch pack 20 (and more particularly, the separator springs 28 of the clutch pack 20) to return the auxiliary pistons 32 into the bores 34 of the piston body 30. In this way, the dual-area piston 16 may be used in convention transmission systems with the need for additional return components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A transmission comprising:
    a case defining a bore;
    a piston disposed within the bore, the piston and the case defining a fluid chamber in fluid communication with a fluid source, the piston including:
        an annular piston body defining a plurality of auxiliary bores angularly spaced along the annular piston body about a central axis of the annular piston body, and
        a plurality of auxiliary pistons disposed within the auxiliary bores, wherein the piston body and the auxiliary pistons have rear surfaces in communication with the fluid chamber;
    a clutch pack disposed opposite the piston from the fluid chamber, the clutch pack including:
        at least one friction plate,
        at least one separator plate, and
        at least one separator spring; and
    a return spring adapted to bias the annular piston body in a direction away from the clutch pack
    wherein when hydraulic fluid in the fluid chamber is at a first pressure, the auxiliary pistons are adapted to engage the clutch pack and the return spring maintains the piston body spaced from the clutch pack, and when hydraulic fluid in the fluid chamber is at a second pressure, the piston body is adapted to engage the clutch pack, and wherein the first pressure is less than 15 psi and the second pressure is greater than 50 psi.

2. The transmission of claim 1, wherein the return spring is adapted to separate the piston body from the clutch pack when the hydraulic fluid in the fluid chamber is reduced below the second pressure, and wherein the at least one separator spring of the clutch pack is adapted to effect axial translation of the auxiliary pistons within the auxiliary bores when the hydraulic fluid in the fluid chamber is reduced below the first pressure.

3. The transmission of claim 1, wherein the piston body defines a plurality of nodes angularly spaced about the central axis of the piston body, and wherein the auxiliary bores are disposed in the nodes.

4. The transmission of claim 3, wherein an individual node of the plurality of nodes includes a plurality of auxiliary bores for receiving a plurality of auxiliary pistons in the individual node.

5. The transmission of claim 4, wherein the piston body defines sixteen nodes angularly spaced about the central axis of the piston body and thirty-two auxiliary bores.

6. The transmission of claim 5, wherein the return spring includes a plurality of resilient tabs, the resilient tabs extending between the angularly spaced nodes and into engagement with the piston body.

7. A clutch engagement piston having a first face for interfacing a fluid chamber and a second face opposite the first face for interfacing a clutch pack, comprising:
an annular piston body defining a plurality of auxiliary bores angularly spaced about a central axis of the piston body and defining a plurality of nodes angularly spaced about the central axis of the piston body, the auxiliary bores being disposed in the nodes; and
a plurality of auxiliary pistons disposed within the auxiliary bores and axially displaceable relative to the piston body,
wherein an individual node of the plurality of nodes includes a plurality of auxiliary bores for receiving a plurality of auxiliary pistons in the individual node.

8. The clutch engagement piston of claim 7, wherein exterior surfaces of the auxiliary pistons are in direct engagement with surfaces of the auxiliary bores.

9. The clutch engagement piston of claim 7, wherein the auxiliary pistons are cylindrical auxiliary pistons having a height greater than a depth of the auxiliary bores.

10. A clutch engagement piston having a first face for interfacing a fluid chamber and a second face opposite the first face for interfacing a clutch pack, comprising:
an annular piston body defining a plurality of auxiliary bores angularly spaced about a central axis of the piston body; and
a plurality of auxiliary pistons disposed within the auxiliary bores and axially displaceable relative to the piston body,
wherein the auxiliary pistons are cylindrical auxiliary pistons having a height greater than a depth of the auxiliary bores.

* * * * *